United States Patent [19]

Brock

[11] Patent Number: 5,413,008

[45] Date of Patent: May 9, 1995

[54] ADJUSTMENT MECHANISM FOR RIGID BOOT OF A VEHICLE TRANSMISSION SHIFTER

[75] Inventor: Robert D. Brock, Grand Haven, Mich.

[73] Assignee: Grand Haven Stamped Products, Div. of JSJ Corporation, Grand Haven, Mich.

[21] Appl. No.: 133,967

[22] Filed: Oct. 8, 1993

[51] Int. Cl.[6] .................. G05G 1/00; B60K 20/02
[52] U.S. Cl. ..................... 74/18; 74/473 R; 74/543; 74/545; 74/563; 74/566
[58] Field of Search ............... 74/566, 563, 543, 545, 74/473 R, 18; 29/466, 525.1, 271; 49/482.1; 277/212 R, 212 C, 212 F, 212 FB

[56] References Cited

U.S. PATENT DOCUMENTS 1,313,412  8/1919  Noser .................. 74/473 R
4,552,031  11/1985  Barbagli ............... 74/473 R

*Primary Examiner*—Charles A. Marmor
*Assistant Examiner*—Troy Grabow
*Attorney, Agent, or Firm*—Price, Heneveld, Cooper, DeWitt & Litton

[57] ABSTRACT

A mechanism for adjusting the space or gap between a rigid, spherical boot and the periphery of an opening in a console trim plate through which the shift lever of the shifting mechanism extends. The mechanism provides both radial adjustment for providing a uniform gap and also allows for the assembly to be easily adjusted up or down with respect to the opening in the console trim plate.

20 Claims, 6 Drawing Sheets

ADJUSTMENT MECHANISM FOR RIGID BOOT OF A VEHICLE TRANSMISSION SHIFTER

This invention relates to a shifting mechanism, particularly for automotive vehicles, in which the shift lever extends through an opening having a circular periphery and a rigid boot is connected to the lever for covering the opening. This invention specifically relates to a means for adjusting the gap between the exterior face of the boot and the periphery of the opening.

BACKGROUND OF THE INVENTION

Vehicle shifters have been developed wherein the shift lever extends through an opening in the console trim plate, the opening permitting a three axis pivoting of the shifter. In other words, the shifter lever is shifted not only forwardly and rearwardly, but also sideways to the right and left. To permit such shifting action, it has been proposed that the opening be made circular with a rigid semi-spherical boot attached to the shift lever so as to substantially and continuously cover the circular opening regardless of whether the shift lever is shifted forwardly, rearwardly or sideways. However, this has created some problems due to various tolerances in the building of the shifter, the console, and various other components. That is, it has not been possible to center the circular opening of the console trim plate with the semi-spherical shifter boot. The result has been a differing gap along the entire periphery of the circular opening. From an aesthetic viewpoint, such differences in the gap are unacceptable and thereby rendering the use of a shifting mechanism having a shift lever with a rigid boot unmarketable.

SUMMARY OF THE INVENTION

In accordance with my invention, I adjust the space or gap created between the spherical boot and the console trim plate by connecting to the shift lever a plurality of first positioning means and to the boot a plurality of second positioning means for cooperatively engaging the plurality of the first engaging means. One of these first or second positioning means are adjustable to selectively engage different ones of the other first or second positioning means whereby the gap between the face of the boot and the periphery of the opening can be adjusted.

More specifically, the semi-spherical rigid boot is provided with an opening for receiving the elongated shift lever. This boot opening is slightly offset from the centerline of the semi-spherical boot. A flange is connected to the elongated shift lever and on this flange are provided a plurality of positioning means located on a circle, the center radius of which is offset from the longitudinal axis of the shift lever and the centerline of the semi-spherical rigid boot. Second positioning means is located on the boot for engaging the first positioning means. This second positioning means is also located on a circle, the center of radius coinciding with the center radius of the circle on which the first positioning means are located. As a result of this arrangement, the eccentric rotation of the rigid boot, that is, about an axis offset from the centerline of the semi-spherical boot adjusts the gap between the periphery of the circular opening and the face of the rigid spherical boot.

In accordance with a more narrow aspect of this invention, the first positioning means comprises an eccentric nut threadedly mounted on the elongated shift lever about the longitudinal axis of the lever. The nut has a flange with a plurality of recesses, preferably openings, spaceally located on a circle about an axis located above or below and to one side of the centerline of the spherical boot which coincides with the longitudinal axis of the shift lever. Extending below the flange is a cylindrical protrusion, the center radius of such protrusion also being offset from the longitudinal axis of the shift lever so as to coincide with the center radius of the circle on which the recesses are located. The rigid boot is rotatably mounted on this eccentric protrusion and a biasing means is provided for forcing the boot upwardly into engagement with the flange so that the second positioning means of the boot, which are nibs, engage the recesses of the flange. The adjustment is made by forcing the boot downwardly against biasing means and rotating it. As the boot is indexed around the eccentric protrusion of the nut, the desired uniform gap between the circular opening in the console trim plate and the face of the rigid boot is observed. As soon as a uniform gap is obtained, a release of the boot causes the nibs of the boot to engage the recesses and hold the boot in that position.

In still another more narrow aspect of this invention, the vertical adjustment of the rigid boot with respect to the circular opening in the console trim plate can be made to adjust the nut and the rigid boot up and down on the threaded lever.

It should be evident from the above description and the detailed description as follows that I have provided a unique construction for adjusting the gap between a spherical rigid boot and the opening in a console trim plate.

BRIEF DESCRIPTION OF THE DRAWINGS

This invention will be described in conjunction with the drawings wherein.

DETAILED DESCRIPTION OF THE PREFERRED EMBODIMENT

Figure 1:
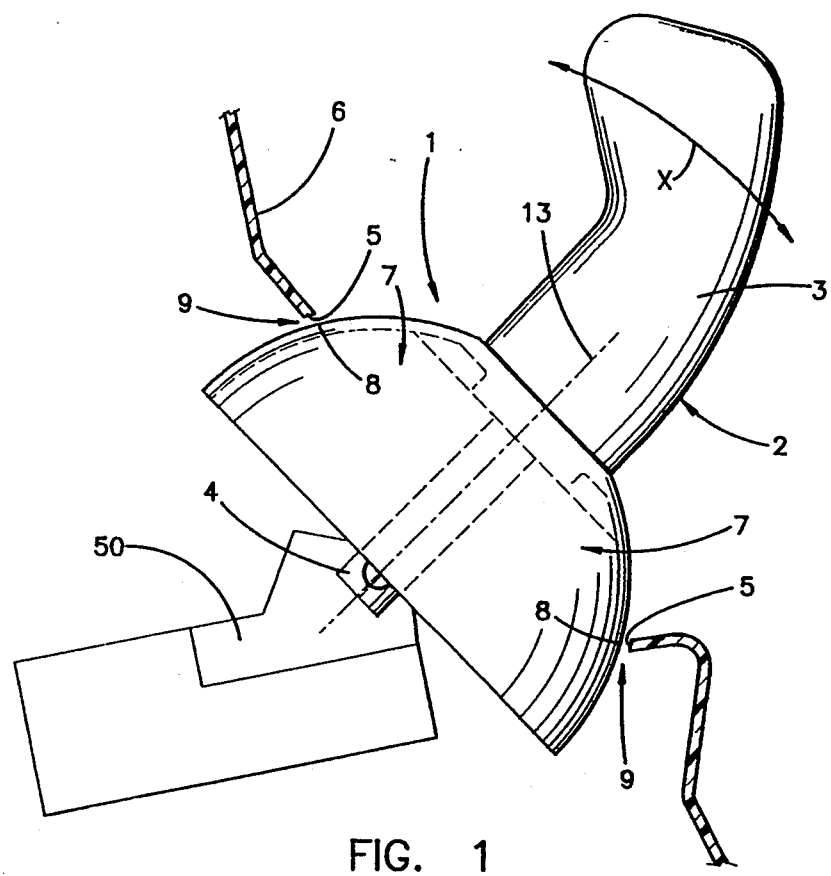
FIG. 1 a side-elevational view of a sketch disclosing a shift lever extending through the opening in a console trim plate and having a rigid semi-spherical boot for substantially and continuously covering the opening.
Figure 2:
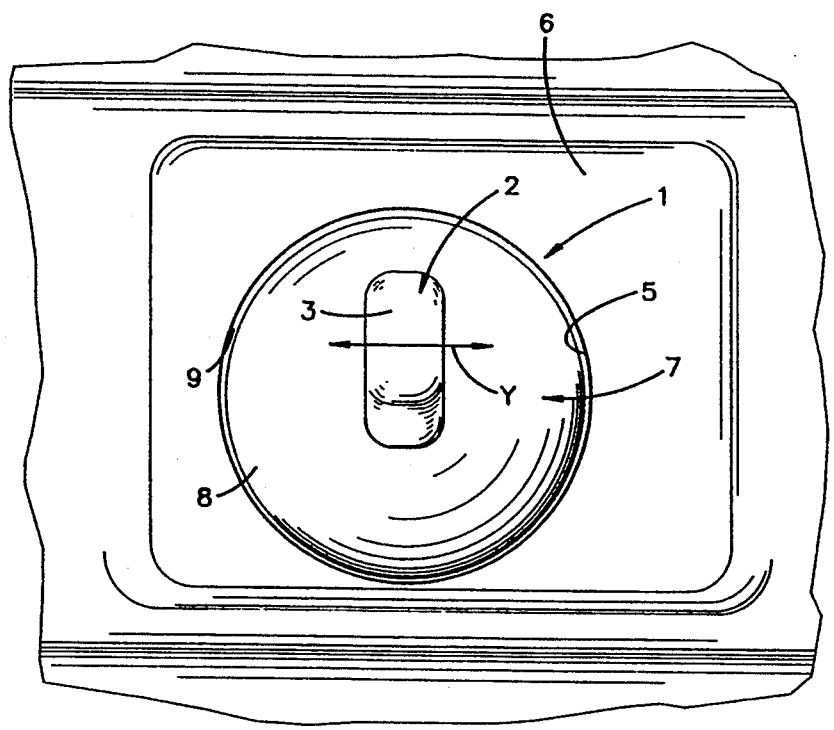
FIG. 2 is a view of the shift lever of FIG. 1 looking in the direction from the right side.

Referring to FIG. 1, reference numeral 1 designates a shifting mechanism including the shift lever 2 having a handle 3 at one end thereof and the shift lever 4 extending downwardly therefrom for actuating the mechanism 50 about three axes (not shown). The mechanism 50 can be any well-known three axis shifter mechanism which is responsive to the fore and aft movement as represented by the arrows X and/or sideways movement as represented by the arrows Y (FIG. 2). For example, such mechanism could be the mechanism as described in U.S. Pat. No. Re. 31,451. Shift lever 4 extends through the opening 5 of the console trim plate 6, which as shown is a part of the dashboard, although it could be a part of a center console between the driver and passenger seats. A rigid semi-spherical boot 7 is attached to the shift lever 4 to cover the opening 5. This invention relates to a mechanism to adjust the space or gap 9 (FIG. 1) between the face 8 of the rigid boot 7 and the periphery 5 of the console trim plate 6.

Figure 3:
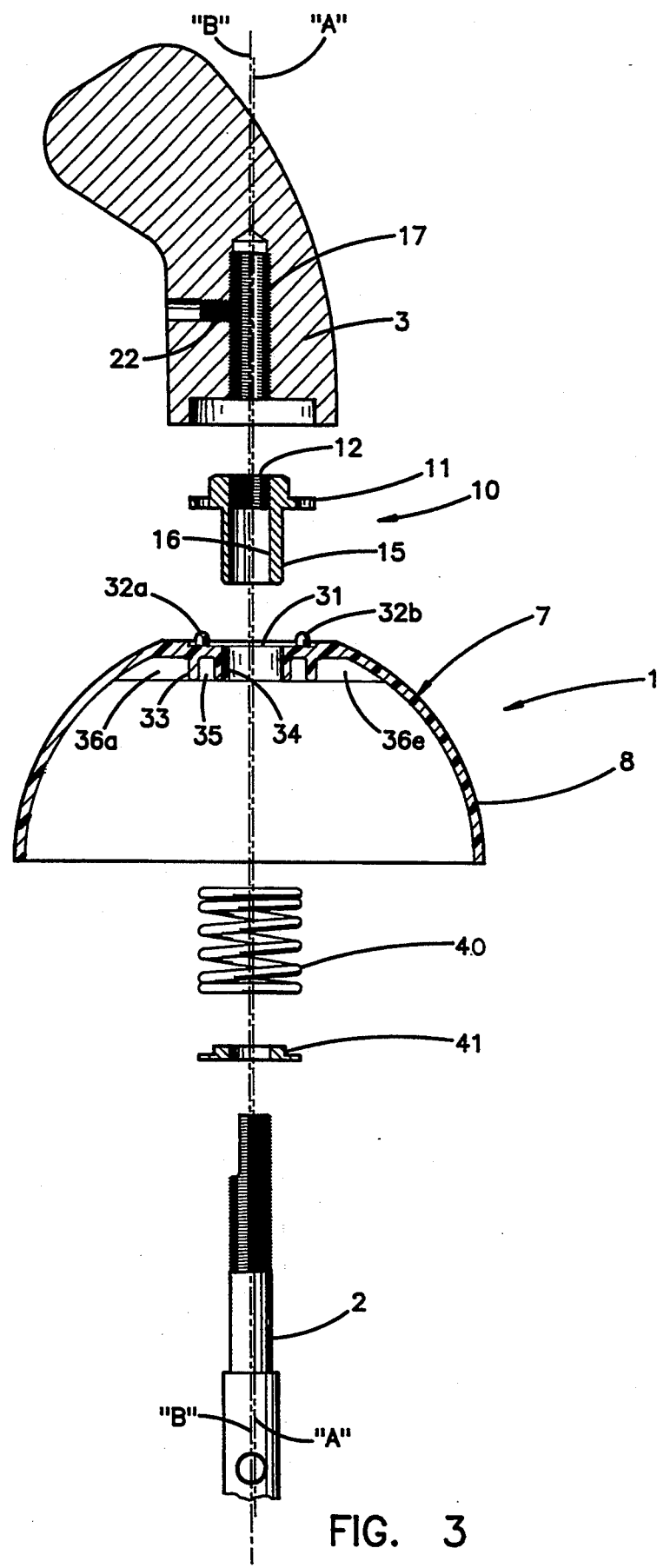
FIG. 3 is an exploded view of the various parts of a shift lever incorporating my invention.
Figure 8:
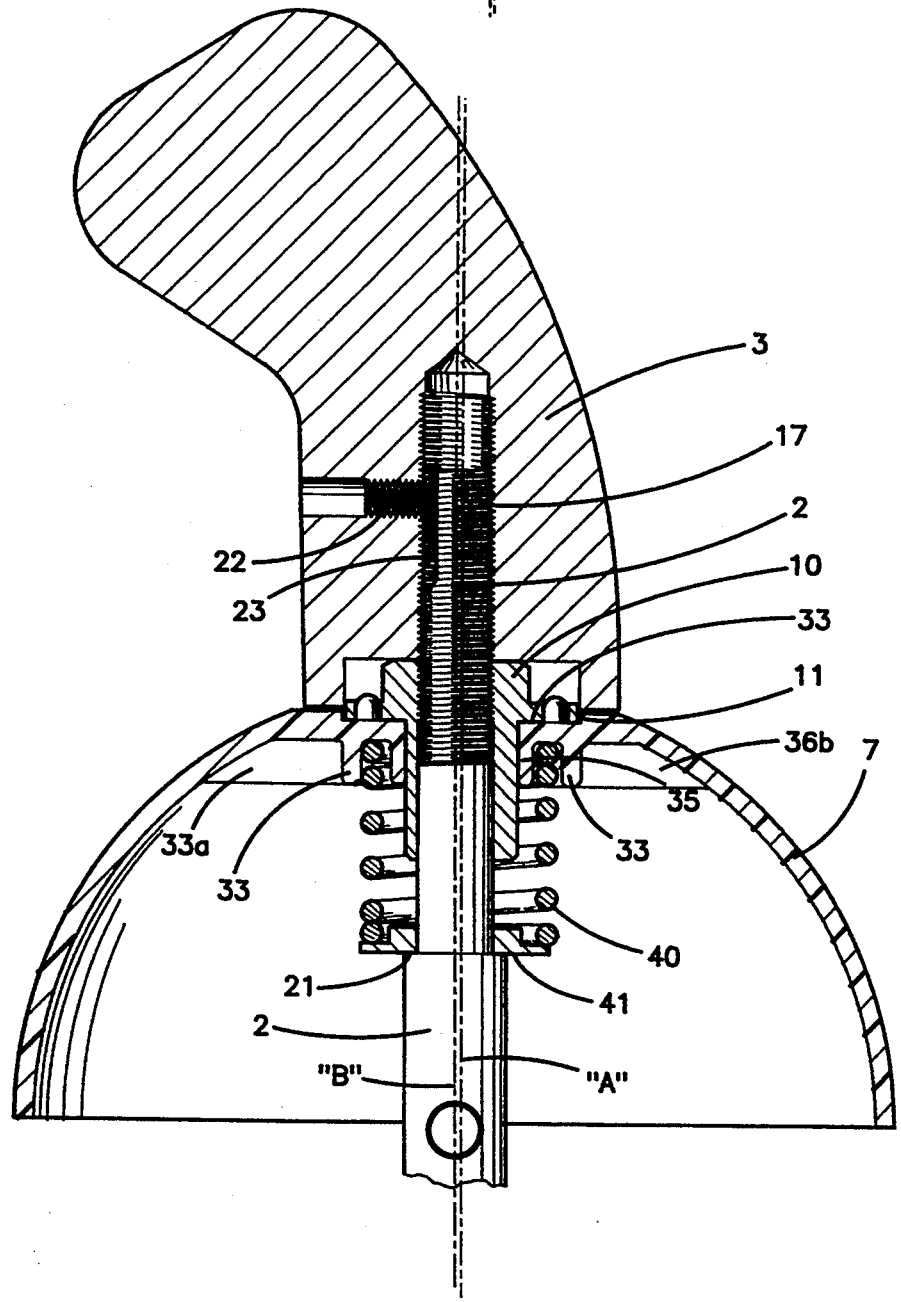
FIG. 8 is side-elevational, cross-sectional view of the assembled parts of FIG. 3.

FIGS. 3 and 8 disclose the various components of my shifter 1 including the handle 3, the eccentric nut 10, the rigid boot 7, and the biasing spring 40, which is held in place by the collar 41. All of the above parts or components are secured to the shift lever 2.

As disclosed in FIG. 8, the collar 41 rests on the shoulder 21 of the shift lever 2. Spring 40 is located on the collar 41 between the collar and the semi-spherical boot 7 above which is mounted the eccentric nut 10 which holds the spring 40 in compression causing spring 40 to force the boot 7 upwardly against the flange 11 of the nut 10. The handle 3 includes a dead end threaded opening 17 which receives the top end of the shift lever 2. Handle 3 is screwed into the threaded end of lever 2 and held in place on the top end of the shift lever 2 by the set screw 22.

Figure 4:
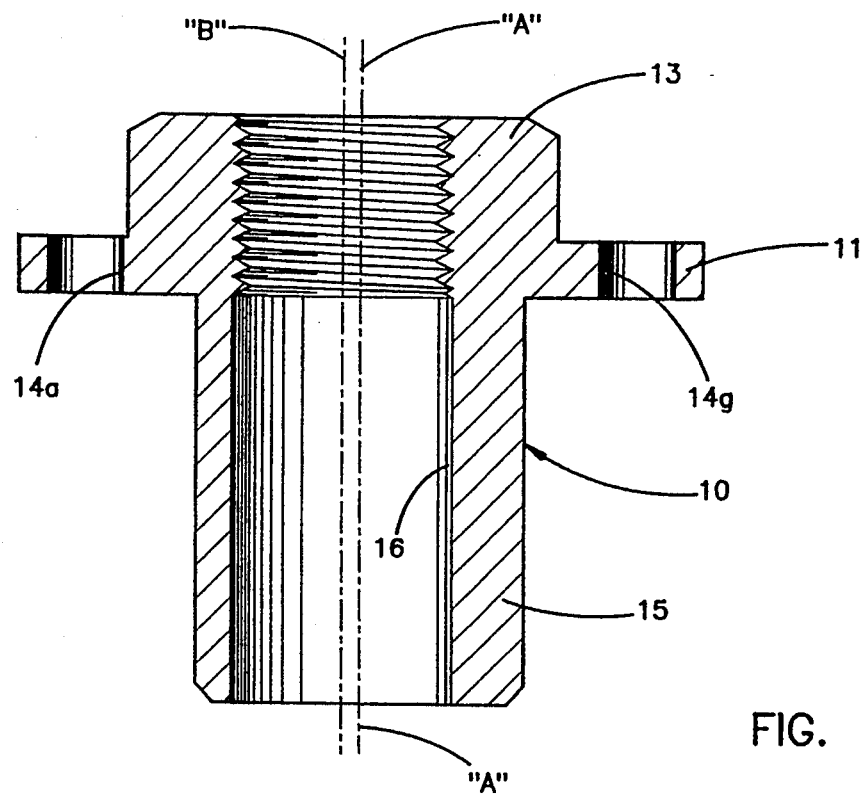
FIG. 4 is an enlarged, side-elevational, cross-sectional view of the eccentric nut which is one component of my invention.
Figure 5:
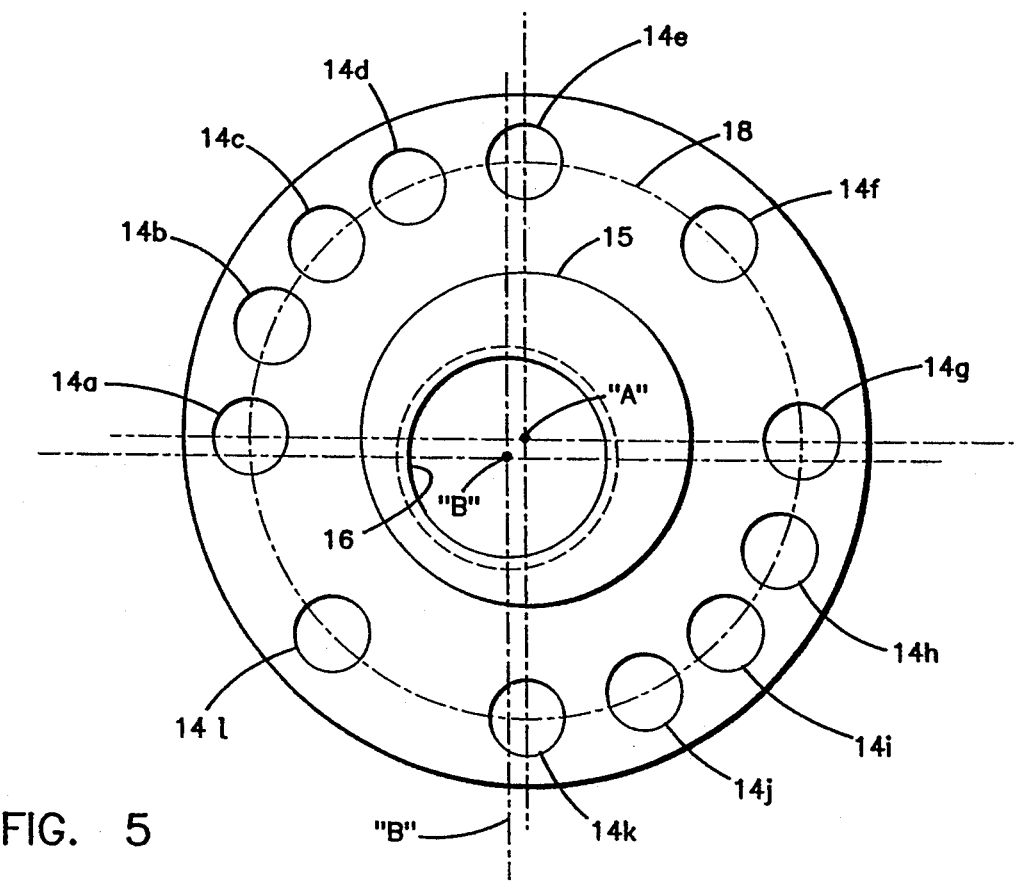
FIG. 5 is a bottom view of the eccentric nut of FIG. 4.

Referring to FIGS. 4 and 5, which disclose the eccentric nut 10, it will be noted that nut 10 is elongated and includes a tapped or threaded portion 12 having a central axis "B". The tapped portion 12 threadedly receives the upper end of the shift lever 2 (FIG. 8) which has a central longitudinal axis "B" concentric with the longitudinal axis "B" of the shift lever 2. Nut 10 has a top hexagonal end 13 (FIGS. 4 and 9A-9C) for rotating and screwing the nut on the end of shift lever 2. As previously referred to, nut 10 has a flange 11 which has a plurality of spaced openings or recesses 14a-14l located on the circle or, in other words, having a locus of their centers located on the circle 18. The center radius of circle 18 is as disclosed on FIG. 5 at the point "A" which is offset 1 mm to the right and 1 mm upwardly from the central axis "B" of the tap opening 12 through which the longitudinal axis "B" of the shift lever 2 extends. As will be described hereinafter, the openings or recesses 14a-14l are provided to index the position of the rigid boot so as to adjust the same for providing a uniform gap between the periphery of the opening 5 in the face 8 of the boot 7.

The eccentric nut 10 includes a cylindrical protrusion 15 having a bore 16 continuing downwardly from the tapped or threaded section 12 of the nut. The cylindrical protrusion 15 has as its center of radius an axis "A" which extends through the radius center of circle 18. Therefore, the protrusion 15 is eccentric to the bore 16 and threaded upper end 12.

Figure 6:
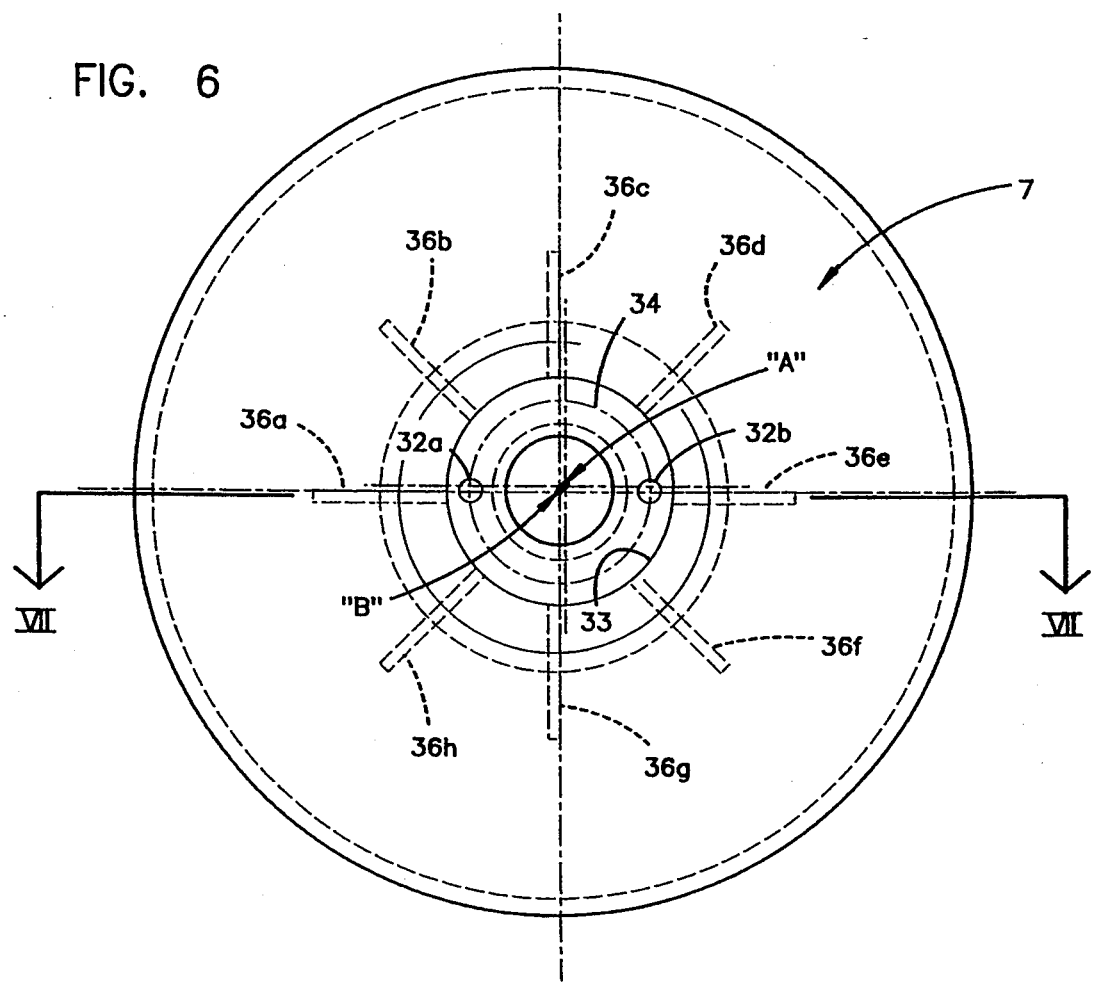
FIG. 6 is an enlarged, top view of the rigid boot forming a component of this invention, the enlargement being less than that of FIGS. 4 and 5.
Figure 7:
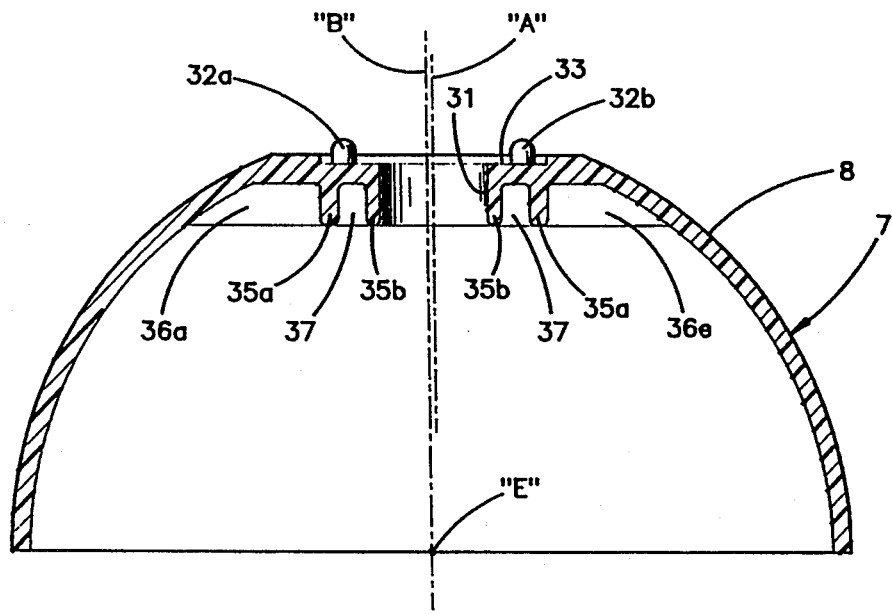
FIG. 7 is a side-elevational, cross-sectional view taken along the plane VII—VII of FIG. 6.

Referring now to FIGS. 6 and 7 which disclose the rigid boot 7, it will be noted that it is semi-spherical in shape, the sphere having the center "E" through which the centerline "B" extends which falls on the same axis as the longitudinal axis "B" of the shift lever 2 and the centerline of eccentric nut 10. The rigid boot 7 has an opening 31 located slightly off center of centerline "B" the same degree as the centerline "A" is offset from the centerline "B" extending through the center "E" of the sphere of the boot 7. The boot 7 is cut off at the top and is provided with a cylindrical recess 33 for receiving the flange 11 of the eccentric nut 10 (FIG. 8). A pair of nibs or pins 32a and 32b extend upwardly from the recess 31. These nibs are located on the circle 34 which corresponds to the circle 18 of the nut 10 so as to be received into diametrically opposed openings or recesses 14a-14l. Extending downwardly from the cut off top, are the spaced cylindrical flanges 35a and 35b providing the groove 37 for receiving the coil spring 40 (FIG. 8). Strengthening ribs 36a-36f extend downwardly from the top of boot 7.

Figure 10:
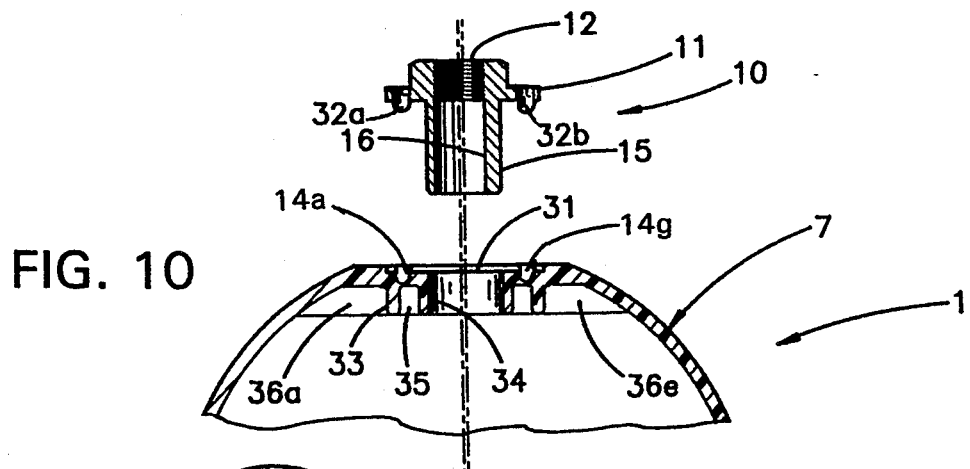
FIG. 10 is a partial, cross-sectional drawing in which the plurality of first positioning means are nibs and the plurality of second positioning means are recesses.

Referring to FIG. 10 it should be understood that one of the said plurality of first positioning means and plurality of second positioning means are nibs and the others are recesses (see FIGS. 3 and 10).

ASSEMBLY

Having described all of the components or parts of my shifter, the assembly of the same should be evident from FIG. 8. In assembling the parts, the collar 41 is placed over the end of the shift lever 2 after which the spring is placed over the shift lever 2 onto the collar 41. The rigid boot 7 is then placed over the spring 40 with the springs being received within the groove 37. The eccentric nut 10 is then screwed onto the end of shift lever 2 to compress spring 40 sufficiently for the spring 40 to apply a pressure to cause the rigid boot to stay in contact with the eccentric nut with nibs 32a and 32b located in one of a pair of diametrically opposite openings 14a-14l. The entire assembly is then connected to the mechanism 50 with the boot extending within the opening 5 of the console trim plate 6.

OPERATION

If the gap or space 9 between the periphery of the opening 5 and the face 8 of boot 7 is uniform, no adjustment is necessary. However, due to various tolerances in the building of the shifter, console, and various other components, very rarely, without adjustment, does the spherical boot 7 end up in the center of the opening of the console trim and as a result, unsightly variations in the gap 9 between the periphery of the opening 5 and the face of the boot 7 exist. One such unsightly gap is disclosed in FIG. 9A wherein at the top of the opening, there is a substantial gap and at the bottom there is a very thin gap which destroys the aesthetic effect of the entire assembly.

Figure 9A:
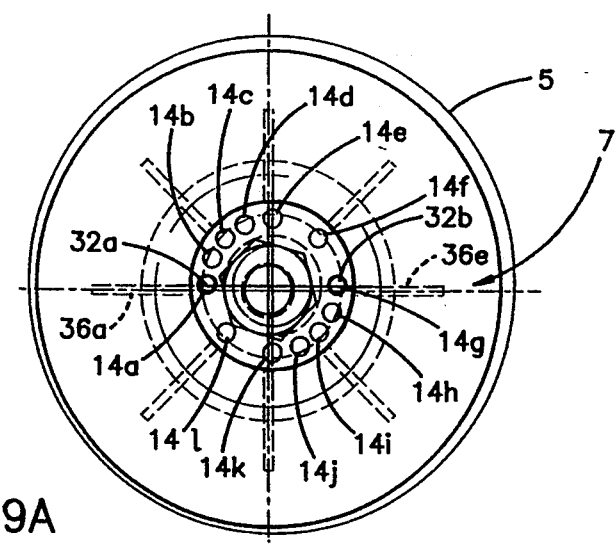
FIGS. 9A, 9B, and 9C are schematic views disclosing three adjusted positions of the rigid boot within an opening of a console trim plate.
Figure 9B:
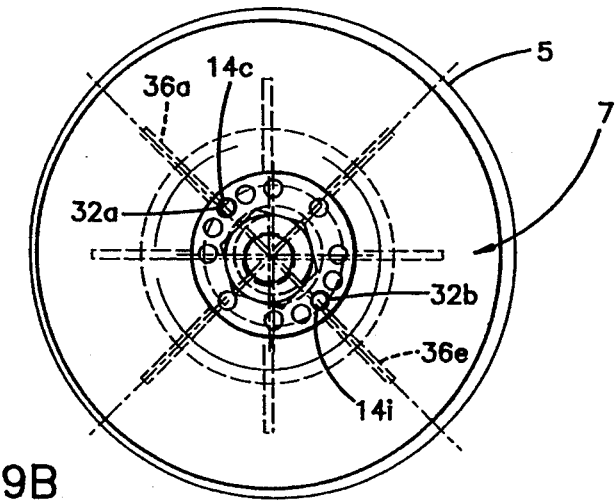

FIG. 9B shows one adjustment made by forcing the boot 7 downwardly against the bias of spring 40 and rotating boot 7 until the nibs or pins 32a and 32b (shown as darkened elements) are engaged within the openings 14c and 14i, respectively. Although with this adjustment the bottom of the rigid boot is moved away from the periphery of the opening 5, it is not sufficient to provide a uniform gap around the entire periphery of the opening 5. It will be observed from a comparison of FIGS. 9A and 9B that in moving the pins or nibs 32a and 32b to the positions where they are engaging openings or recesses 14c and 14i, respectively, although the gap at the bottom of the opening 5 is larger, the adjustment made in FIG. 9B is not adequate to provide a uniform gap around the entire periphery of the opening 5 and boot 7.

Figure 9C:
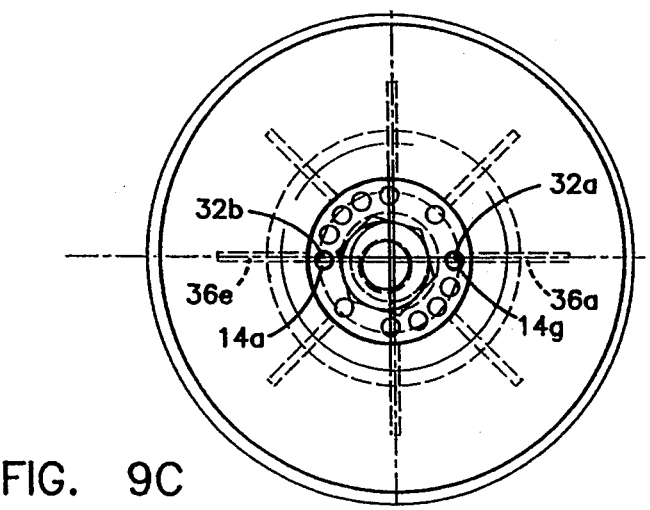

Referring to FIG. 9C, the rigid boot 7 has been rotated 180° from the position of FIG. 9A so that the nib or pin 32a is located in the opening or recess 14g and nib or pin 32b is located in the recess 14a. In this position, the uniform spacing around the periphery of the rigid boot 7 and opening 6 is near perfect. It should be understood that each set of holes in the adjuster is designed to add an additional 0.5 mm of radial adjustment from the shift lever centerline. Therefore, the total adjustment is 2.414 mm (the original 1.0 plus 1.414 of radial travel). If additional adjustment is required, the original offset of 1 mm upwardly and to the right would have to be increased. Once the proper adjustment is made, the spring 40 underneath the boot 7 applies sufficient pressure to force nibs 32a and 32b into openings 14g and 14a, respectively, to thus cause boot 7 to stay in contact with the eccentric nut as the shifter lever is shifted fore and aft or sideways.

It should be also understood that the adjustment of the nut by turning the hex-shaped head 10 allows the entire assembly to be easily adjusted both radially and up or down.

Although I have disclosed the preferred embodiment of this invention, it should be evident that there are other embodiments that could be made without departing from the spirit of this invention. Accordingly, the scope of my invention should be limited only as set forth in the appended claims.

The embodiments of the invention in which an exclusive property or privilege is claimed are defined as follows.

I claim:

1. In a shifting mechanism having an elongated shift lever with one end extending along a longitudinal axis through a first opening to a pivot point, said opening having a circular periphery and a central axis, a rigid semi-spherical boot connected to said lever and movable with said lever in said opening for substantially and continuously covering said opening, and means for adjusting the gap between the exterior face of said boot and the periphery of said opening comprising:

first means connected to said lever and movable therewith, said first means having a plurality of first positioning means, the locus of which is a circle located around the longitudinal axis of said lever;

second means on said boot having a plurality of second positioning means, the locus of which is on said circle, said second positioning means cooperatively engaging said first positioning means to establish the position of said face of said rigid boot in relationship to said periphery;

said circle having its center of radius offset from the longitudinal axis of said lever and centerline of said semi-spherical boot;

said second positioning means being adjustable laterally of said longitudinal axis of said lever to selectively engage different ones of said first positioning means to move said boot laterally in said opening whereby the gap between said face of said boot and the periphery of said opening can be adjusted to substantially provide a uniform gap.

2. The shifting mechanism of claim 1 in which one of said plurality of first positioning means and said plurality of second positioning means are nibs and the others are recesses for receiving said nibs.

3. The shifting mechanism of claim 2 in which the recesses are openings and the second positioning means includes two diametrically opposite located nibs.

4. The shifting mechanism of claim 1 in which the first means is a flange extending radially from said lever and with said plurality of first positioning means thereon;

said boot having an opening receiving said lever; and said second positioning means is located on said boot adjacent said opening in a position to receive said first positioning means.

5. The shifting mechanism of claim 4 in which the plurality of first positioning means are recesses and the second positioning means are nibs.

6. The shifting mechanism of claim 1 in which the first means is a nut on said lever and having a radial flange with said plurality of first positioning means thereon;

said semi-spherical boot having an opening receiving said nut and lever, the centerline of said boot opening being offset from the centerline of the semi-spherical boot and said longitudinal axis of said lever; and said second positioning means located adjacent said opening on said boot and in a position to engage said first positioning means.

7. The shifting mechanism of claim 6 in which the plurality of first positioning means are recesses and the second positioning means are nibs.

8. The shifting mechanism of claim 1 in which said first means is a nut threaded on said lever about the longitudinal axis of said lever, said nut having a radially extending flange with said first plurality of positioning means being located on a circle the center of radius being offset from the longitudinal axis of said lever; said nut having a cylindrical protrusion extending downwardly from said flange and having the same center of radius as said circle; said semi-spherical boot having an opening receiving said cylindrical protrusion, said boot opening having a center of radius offset from the centerline of said semi-spherical boot.

9. The shifting mechanism of claim 8 in which one of said first positioning means and second positioning means is a plurality of nibs and the other is a plurality of recesses for receiving said nibs.

10. The shifting mechanism of claim 1 in which an adjustment means is provided for adjusting the boot on said lever in a direction along said longitudinal axis.

11. The shifting mechanism of claim 10 in which the adjustment means is a nut threadedly adjustable longitudinally on said lever and having a radial flange with said plurality of first positioning means thereon;

said boot having an opening receiving said lever; and said second positioning means is located on said boot adjacent said opening in a position to receive at least one of said first positioning means.

12. The shifting mechanism of claim 11 in which the plurality of first positioning means are recesses and the second positioning means is a plurality of nibs.

13. The shifting mechanism of claim 12 in which the recesses are openings and the second positioning means includes two diametrically opposite located nibs.

14. The shifter mechanism of claim 1 in which biasing means is provided forcing said first positioning means and said second positioning means into engagement for holding said boot in an adjusted position.

15. In a shifting mechanism having a shift lever with one end extending through a first opening and a rigid boot connected to said lever and movable with said lever in said opening for substantially and continuously covering said opening, the improvement comprising:

said boot being a portion of a hollow sphere having an exterior face with edges;

a second circular opening in said boot located from the edges and having a center axis offset from the centerline of said portion of said sphere;

said lever extending through said second opening providing a handle at one end and an actuator at the other end;

a positioning member secured to said lever, said member having a plurality of spaced recesses located on a circle having its center of radius on said center of axis of said second circular opening offset from the longitudinal axis of said lever;

said sphere having at least one nib spaced from the center axis of said second opening and located in a position to receive at least one of said recesses; and said longitudinal axis and said center axis being offset one from the other whereby rotatably adjusting one of said positioning member and sphere to different positions wherein different ones of said recesses are engaged by said nibs, adjusts the spacing between said face of said rigid boot and the periphery of said first opening.

16. The shifting mechanism of claim 15 in which the positioning member is rotatably mounted on the said lever and has a radial flange with said recesses located on said flange.

17. The shifting mechanism of claim 16 in which an adjustment means is provided for adjusting the positioning member and boot on said lever in a direction along said longitudinal axis.

18. The shifter mechanism of claim 17 in which said positioning member is a nut threadedly mounted on said lever.

19. The shifter mechanism of claim 18 in which biasing means is provided forcing said boot upwardly to force said nibs into said recesses.

20. In a shifting mechanism having a shift lever with one end extending through a first opening and a rigid boot connected to said lever and movable with said lever in said opening for substantially and continuously covering said opening, the improvement comprising:

said boot being a portion of a hollow sphere having an exterior face with edges;

a second circular opening in said boot located from the edges and having a center axis offset from the centerline of said portion of said sphere;

said lever extending through said second opening providing a handle at one end and an actuator at the other end;

a positioning member secured to said lever, one of said member or sphere having a plurality of spaced recesses located on a circle having its center of radius on said center of axis of said second circular opening offset from the longitudinal axis of said lever;

the other of said sphere or positioning member having at least one nib spaced from the center axis of said second opening and located in a position to be received by at least one of said recesses; and said longitudinal axis and said center axis being offset one from the other whereby rotatably adjusting one of said positioning member and sphere to different positions wherein different ones of said recesses are engaged by said nibs, adjusts the spacing between said face of said rigid boot and the periphery of said first opening.

* * * * *

UNITED STATES PATENT AND TRADEMARK OFFICE
CERTIFICATE OF CORRECTION

PATENT NO. : 5,413,008
DATED : May 9, 1995
INVENTOR(S) : Robert D. Brock

It is certified that error appears in the above-indentified patent and that said Letters Patent is hereby corrected as shown below:

Column 2, line 3;

"spaceally" should be --spacedly--.

Signed and Sealed this

Third Day of October, 1995

Attest:

BRUCE LEHMAN

Attesting Officer     Commissioner of Patents and Trademarks